US009448754B2

(12) United States Patent
Baxter et al.

(10) Patent No.: US 9,448,754 B2
(45) Date of Patent: Sep. 20, 2016

(54) RESOLVING LABEL COLLISIONS ON A DIGITAL MAP

(71) Applicant: GOOGLE INC., Mountain View, CA (US)

(72) Inventors: William V. Baxter, Seattle, WA (US); Michael P. Davidson, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 380 days.

(21) Appl. No.: 13/895,135

(22) Filed: May 15, 2013

(65) Prior Publication Data
US 2015/0187337 A1  Jul. 2, 2015

(51) Int. Cl.
*G09G 5/14* (2006.01)
*G06F 3/14* (2006.01)
*G01C 21/36* (2006.01)
*G06F 3/0481* (2013.01)
*G06T 3/40* (2006.01)
*G09B 29/00* (2006.01)
*G06T 11/00* (2006.01)

(52) U.S. Cl.
CPC ............. *G06F 3/14* (2013.01); *G01C 21/3673* (2013.01); *G06F 3/0481* (2013.01); *G06T 3/40* (2013.01); *G06T 11/00* (2013.01); *G09B 29/005* (2013.01); *G06F 2203/04805* (2013.01); *G09G 2340/045* (2013.01); *G09G 2340/14* (2013.01)

(58) Field of Classification Search
CPC ............................................... G09G 2340/045
USPC ........................................................ 345/660
See application file for complete search history.

(56) References Cited

U.S. PATENT DOCUMENTS

| 4,914,605 | A | 4/1990 | Loughmiller, Jr. et al. |
| 6,724,392 | B1 | 4/2004 | Wiley et al. |
| 7,388,519 | B1 * | 6/2008 | Kreft ........................ 340/995.24 |
| 7,414,637 | B2 | 8/2008 | Fogel et al. |
| 7,715,980 | B2 * | 5/2010 | Bargeron et al. ............. 701/425 |
| 8,223,172 | B1 * | 7/2012 | Miller et al. .................. 345/660 |
| 8,237,745 | B1 * | 8/2012 | Cornell et al. ................ 345/660 |
| 8,265,863 | B2 | 9/2012 | Bowman et al. |
| 8,363,068 | B1 * | 1/2013 | Miller .................... G06F 3/0481 345/660 |
| 8,896,630 | B1 * | 11/2014 | Miller ....................... G06T 3/40 345/636 |
| 8,937,627 | B1 * | 1/2015 | Otero et al. ................... 345/619 |
| 9,030,499 | B2 * | 5/2015 | Borger et al. ................. 345/660 |
| 9,049,554 | B2 * | 6/2015 | Dicke ..................... G01C 21/32 |
| 2004/0046760 | A1 * | 3/2004 | Roberts ............... G06F 17/5004 345/474 |
| 2007/0229513 | A1 * | 10/2007 | Bowman ....................... 345/467 |
| 2008/0036787 | A1 | 2/2008 | Gelber |
| 2008/0077558 | A1 * | 3/2008 | Lawrence ......... G06F 17/30867 |
| 2008/0231643 | A1 * | 9/2008 | Fletcher et al. .............. 345/661 |

(Continued)

*Primary Examiner* — Javid A Amini
(74) *Attorney, Agent, or Firm* — Marshall, Gerstein & Borun LLP

(57) ABSTRACT

A technique for displaying labels on a digital map comprise displaying the digital map via a user interface at a first zoom level, including displaying non-overlapping labels. The method also comprises receiving, via the user interface, a request to zoom out from the digital map to a second zoom level, where the second zoom level corresponds to smaller magnification than the first zoom level, and where the plurality of labels have the same size at the first zoom level and the second zoom level. Still further, the method includes resolving collisions among the plurality of labels at the second zoom level in response to receiving the request and prior to zooming out from the first zoom level, and zooming out from the digital map at the first zoom level to the second zoom level via at least one intermediate zoom level.

20 Claims, 3 Drawing Sheets

(56) References Cited

U.S. PATENT DOCUMENTS

| | | | |
|---|---|---|---|
| 2009/0181650 A1 | 7/2009 | Dicke | |
| 2009/0182500 A1* | 7/2009 | Dicke | G01C 21/32 701/532 |
| 2009/0182501 A1* | 7/2009 | Fyke et al. | 701/208 |
| 2009/0244095 A1 | 10/2009 | Bowman et al. | |
| 2009/0263026 A1* | 10/2009 | Verne | G06Q 30/0241 382/209 |
| 2010/0333017 A1* | 12/2010 | Ortiz | 715/800 |
| 2011/0118966 A1* | 5/2011 | Finnis et al. | 701/117 |
| 2011/0231872 A1* | 9/2011 | Gharachorloo | H04N 21/4126 725/28 |
| 2013/0080504 A1* | 3/2013 | Maurer et al. | 709/203 |
| 2013/0147846 A1* | 6/2013 | Kalai et al. | 345/660 |
| 2013/0300764 A1* | 11/2013 | Gardenfors et al. | 345/629 |
| 2013/0321397 A1* | 12/2013 | Chen | G06T 17/05 345/419 |
| 2013/0321458 A1* | 12/2013 | Miserendino et al. | 345/629 |
| 2014/0329549 A1* | 11/2014 | Dicke | G01C 21/32 455/457 |
| 2014/0354629 A1* | 12/2014 | Adlers et al. | 345/419 |
| 2015/0046856 A1* | 2/2015 | Rucker | G06F 3/0488 715/765 |
| 2015/0070397 A1* | 3/2015 | Miller | G06T 3/40 345/660 |
| 2015/0100869 A1* | 4/2015 | Sunshine et al. | 715/205 |

\* cited by examiner

RESOLVING LABEL COLLISIONS ON A DIGITAL MAP

FIELD OF THE DISCLOSURE

The present disclosure relates to digital maps and, more particularly, to providing a technique for resolving the collision of labels displayed as part of digital maps when changing zoom levels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including portable devices, support software applications that display digital maps ("mapping applications"). For example, mapping applications may run on laptop and tablet computers, mobile phones, car navigation systems, hand-held global positioning system (GPS) units, etc. Mapping applications can include special-purpose software applications as well as web browsers, for example.

A mapping application can display a digital map by rendering a set of vector-based map data that defines specific map elements (based on mathematical descriptions of geometric shapes). The map elements may denote individual streets, building footprints or 3D buildings, parks, bodies of water, natural formations, etc. In addition, map data may include text labels and graphic labels (e.g., symbols, icons, etc.) to identify individual streets, areas, landmarks and other map elements. These labels typically are placed over or near the map elements for which the labels identify or provide information. Typically, labels are defined in a raster (bitmap) format.

A mapping application can display a map at different zoom levels, each corresponding to a different level of magnification and different amount of detail. For example, at a high zoom level, a digital map may show streets, buildings and even sidewalks in an area of a desired location. At lower zoom levels, the map may show major roads, boundaries of neighborhoods, outlines of cities, and other geographic regions. While content defined in a vector graphics format can scale easily, text- and graphic-based labels generally do not scale well. To simplify scaling, a label of the same size can be used for two or more discreet zoom levels, as well as intermediate zoom levels between zoom level. However, as map elements become smaller during scaling, un-scaled labels can begin to overlap.

SUMMARY

According to one embodiment of the techniques of the present disclosure, a method for displaying labels on a digital map is implemented in a computing device. The method comprises displaying the digital map via a user interface at a first zoom level, including displaying a plurality of non-overlapping labels. The method also comprises receiving, via the user interface, a request to zoom out from the digital map to a second zoom level, where the second zoom level corresponds to smaller magnification than the first zoom level, and where the plurality of labels have the same size at the first zoom level and the second zoom level. Still further, the method includes resolving collisions among the plurality of labels at the second zoom level in response to receiving the request and prior to zooming out from the first zoom level, and zooming out from the digital map at the first zoom level to the second zoom level via at least one intermediate zoom level.

In another embodiment, a computer-readable medium stores instructions executable on one or more processor. When executed one or more processors, the instructions cause the one or more processors to display a digital map via the user interface at a first zoom level, where the digital map includes (i) a plurality of elements scalable between the first zoom level and a second zoom level and (ii) a plurality of labels that do not scale between the first zoom level and the second zoom level. The instructions further cause the one or more processors to receive, via the user interface, a request to display the digital map at the second zoom level. Prior to zooming out from the first zoom level, the instructions cause the one or more processors to remove one or more labels from the plurality of labels, so that the remaining ones of the plurality of labels do not overlap at the second zoom level, and, after the one or more labels have been removed, begin to change the zoom level of the digital map from the first zoom level to the second zoom level.

In yet another embodiment, a computing device includes a user interface, one or more processors, and a computer-readable memory storing thereon instructions. When executed on the one or more processors, the instructions cause the computing device to display a digital map via the user interface at a first zoom level, including display a plurality of non-overlapping labels. The instructions further cause the computing device to receive, via the user interface, a request to zoom out from the digital map to a second zoom level, where the second zoom level corresponds to smaller magnification than the first zoom level, and where the plurality of labels have the same size at the first zoom level and the second zoom level. In response to receiving the request and prior to zooming out from the first zoom level, the instructions cause the computing device to resolve collisions among the plurality of labels at the second zoom level. Finally, the instructions cause the computing device to zoom out from the digital map at the first zoom level to the second zoom level via at least one intermediate zoom level.

In still yet another embodiment, an apparatus may display labels on a digital map. The apparatus may include display means for displaying the digital map via a user interface at a first zoom level and for displaying a plurality of non-overlapping labels. The apparatus may also include receiving means for receiving, via the user interface, a request to zoom out from the digital map to a second zoom level, where the second zoom level corresponds to smaller magnification than the first zoom level, and where the plurality of labels have the same size at the first zoom level and the second zoom level. Still further, the apparatus may include resolving means for resolving collisions among the plurality of labels at the second zoom level in response to receiving the request and prior to zooming out from the first zoom level, and zooming out from the digital map at the first zoom level to the second zoom level via at least one intermediate zoom level.

DETAILED DESCRIPTION

Generally speaking, a mapping software module can use the techniques of the present disclosure to avoid the "collision" (overlapping) of displayed labels on a map, when transitioning the map from a higher zoom level view to a lower zoom level view, by resolving potential collision conflicts before these collisions occur.

In general, there may be any number of discrete zoom levels (e.g., 10, 15, 20), and any number of intermediate zoom levels may exist between transitions from one discrete zoom level to the next. At a high zoom level, labels displayed on a map appear separate and distinct at their respective locations. As the zoom level changes to a lower zoom level, the labels do not scale down in size, but remain the same. If the mapping module continues to display these labels, some of the labels may collide or overlap with one another. As used in this disclosure, the term "overlap" may refer to partial or to complete overlap (where one label completely eclipses another label). To help resolve this potential conflict, the mapping software module "peeks ahead" to the next lower discrete zoom level ti determine which labels, if any, will collide or overlap at the next lower discrete zoom level, and then removes the offending labels immediately from the currently displayed map.

Figure 1:
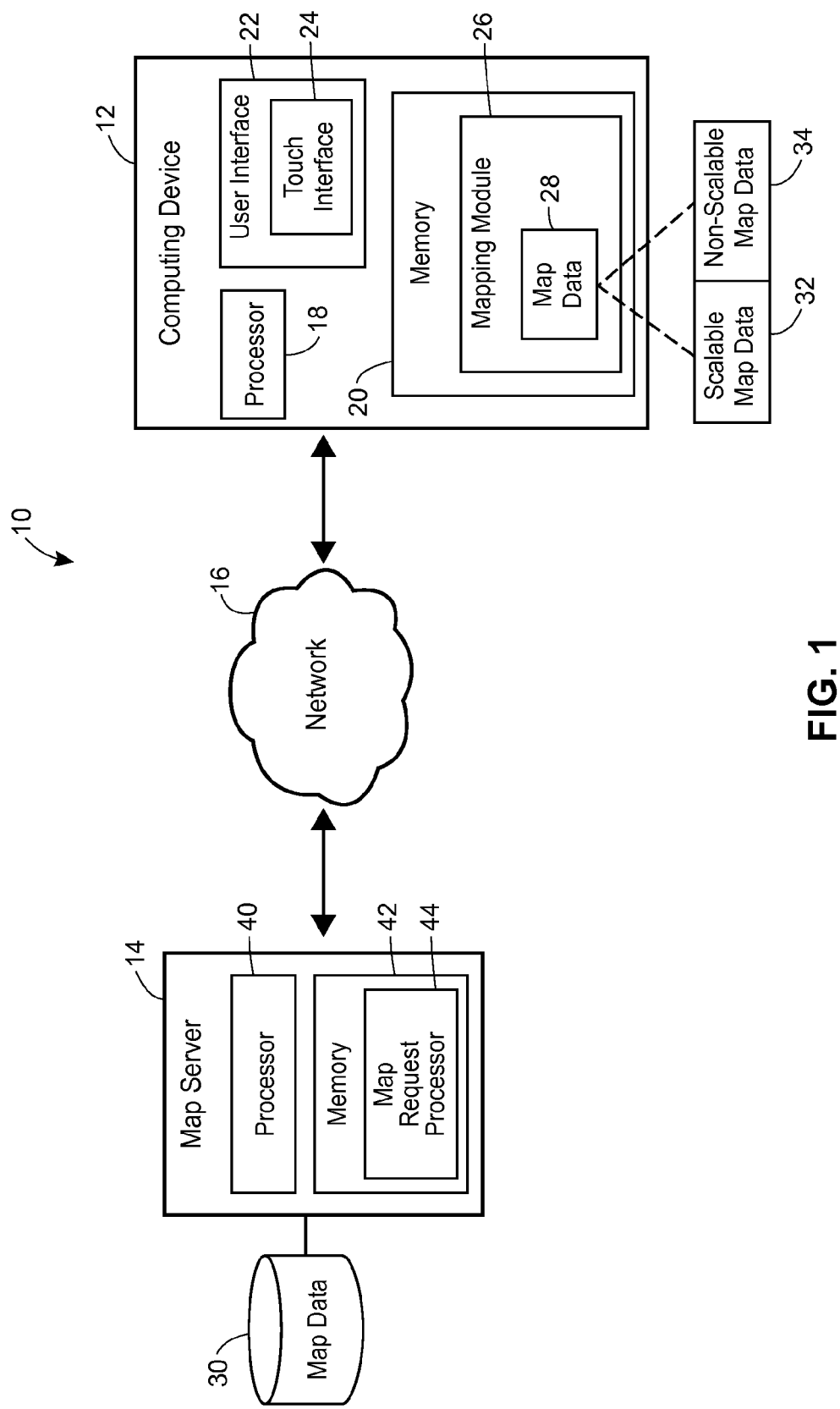
FIG. 1 is a block diagram of an example system in which techniques for resolving label collisions are implemented.

Referring first to FIG. 1, a system 10 includes an example computing device 12 that implements at least some of the techniques for resolving label collisions of the present disclosure. The computing device 12 is coupled to a map server 14 via a communication network 16 that can include wired and/or wireless links. The computing device 12 can be, for example, a smartphone, a tablet computer, a personal digital assistant, a navigation device mounted in a vehicle, or even a desktop computer.

In the implementation illustrated in FIG. 1, the computing device 12 includes one or more processors 18 such as central processing units (CPUs), a computer-readable memory 20, and a user interface 22 including a touch interface or touchscreen 24. More generally, the computing device 12 can include one or more processors and, if desired, one or more graphics processing units (GPUs) as well as other processing units. The memory 20 can be a computer-readable, tangible, non-transitory storage device and can include both persistent (e.g., a hard disk, a flash drive) and non-persistent (e.g., RAM) memory components. The memory 20 stores instructions executable on the processor 18 that make up a mapping software module 26. In this example configuration, the memory 20 also stores map data 28 on which the mapping module 26 operates.

The mapping software module 26 according to various implementations is a separately executable software application, a plugin or an extension that provides additional functionality to another software application such as a web browser, etc. The instructions that make up the mapping module 26 may be compiled and executable on the processor 18 directly, or not compiled and interpreted by another software application at runtime.

In operation, the mapping module 26 generates requests for map data in accordance with how the user positions the viewport using pan, zoom, and other controls. A request for map data can specify, for example, the geographic area for which the computing device 12 will display a digital map, the zoom level, the desired layers of additional information (e.g., traffic, weather, satellite imagery, etc.). The computing device 12 transmits the requests to the map server 14. In response, the map server 14 retrieves map data from a map database 30 and provides the map data to the computing device 12 via the network 16 in a vector graphics format. The computing device 12 then stores the received map data in the memory 20 as the map data 28. The mapping software module 26 generates a digital map using the map data 28 and, when necessary, requests new map data in response to user input (e.g., pan operations, zoom operations) received via the user interface 22.

In the vector graphics format, the map data 28 may be organized into scalable map data 32 and non-scalable map data 34. The scalable map data 32 may be in any suitable vector graphics data format (e.g., Adobe Illustrator®, CorelDRAW®, Computer Graphics Metafile, AutoCAD® DXF, Extended Vector Animation, Windows® Metafile, Gerber®, Haiku Vector Icon Format, Initial Graphics Exchange Specification, Precision Graphics Markup Language, Vector Markup Language, Xar®, etc.). In one implementation, the scalable map data 32 may be in a scalable vector graphics (SVG) format, for example. In the SVG format, geometric primitives (e.g., points, arcs, lines, circles, etc.) are used to represent various map elements such as roads, buildings, bodies of water, and other natural and artificial objects visible outside. For example, an individual street may be represented by one or more line segments, and the SVG data may describe the one or more line segments by indicating the positions of the end points of the line segments. The scalable map data 32 can be scaled according to a desired zoom level. For example, the footprint of a building may shrink and appear smaller as the zoom level decreases. Conversely, the footprint may expand and appear bigger as the zoom level increases.

The non-scalable map data 34 may include data specifying text strings, symbols, icons, etc., to be displayed with the map elements to provide, for example, labels for the map elements. As an example, a text label may be displayed in an area of a city to indicate the name of a city district or neighborhood. In another example, a road shield icon with a number may be displayed next to a major road to indicate the road designation. In any event, the size of these labels is usually dependent on screen resolution and cannot be scaled to become bigger or smaller as the zoom level changes.

With continued reference to FIG. 1, the map server 14 may include a processor 40 and a memory 42 that stores a map request processor 44, made up of instructions executable on the processor 40. According to various implementations, the map server 14 includes one or multiple devices, operate in a distributed or non-distributed manner, are owned by single business entity or different business entities, etc. For the purposes of this discussion, the term "map server" refers to an individual map server device or to a group of two or more map server devices.

In an example scenario, when a user attempts to zoom out of a geographic area from one discrete zoom level to a lower discrete zoom level, scalable map elements (e.g., the scalable map data 32) displayed in the geographic area become smaller and more closely positioned. However, non-scalable elements (e.g., the non-scalable map data 34), such as labels, do not reduce in size and thus appear to move towards one another. To prevent the collision of these labels, the mapping software module 26 may look ahead to the next lower discrete zoom level and identify any potential collisions or overlaps between some of the labels. Once identified, the mapping software module 26 resolves the potential collisions by removing the offending labels before the collisions can occur somewhere between the two discrete zoom levels. More generally, the mapping software module 26 can resolve the conflicts in any suitable manner, such as by changing the transparency level, selectively removing portions of labels, etc.

In determining which offending labels should be removed, the mapping software module 26 may use ranking or priority information which indicates the relative importance of the labels with respect to each other. In an implementation, the ranking information may be computed at a map server (e.g. the map server 14) and included with the labels as part of the non-scalable map data 34. For example, consider a set of labels that identifies names of neighborhoods in a city, which have been ranked according to the population density of the neighborhoods. Thus, if two neighborhood labels will collide, the mapping module 26 may decide to remove the less important neighborhood label, which corresponds to the label identifying a neighborhood with a lower population density, in an example implementation. Additionally or alternatively, the ranking information may be calculated on a client device (e.g., the client device 12) based on one or more user preferences or particular context (e.g., a recent search).

Figure 2A:
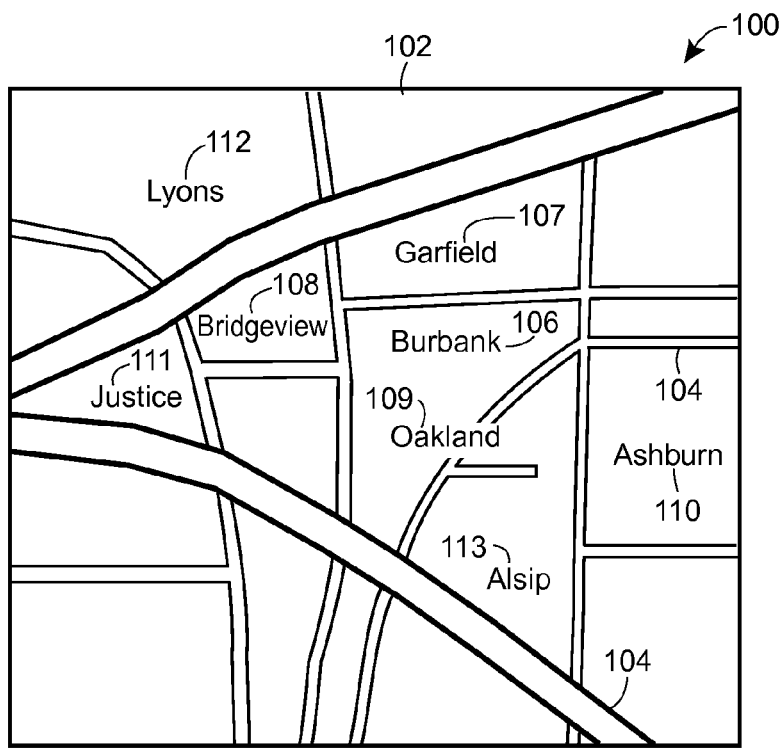
FIG. 2A is an example screenshot which a mapping module can generate to display labels at a zoom level N.
Figure 2B:
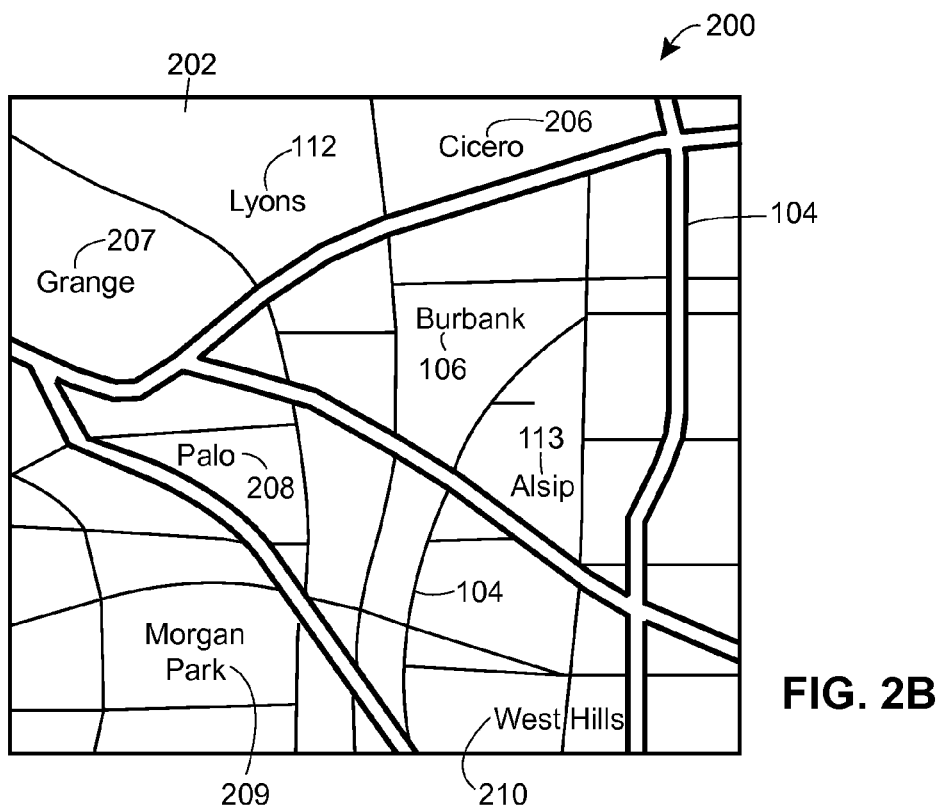
FIG. 2B is an example screenshot which the mapping application can generate to display labels at an intermediate zoom level during a transition from zoom level N to zoom level N−1.

FIGS. 2A and 2B are considered next. These figures illustrate example removal of labels prior to label collisions when transitioning between two discrete zoom levels.

In FIG. 2A, a screenshot 100 depicts a digital map of a geographic area 102 at zoom level N. The geographic area 102 illustrates scalable map elements such as multiple roads 104, and a set of non-scalable text labels 106-113, each indicating a name of neighborhood within the geographic area 102. At the zoom level N, the labels 106-113 appear separately in a non-overlapping manner at their respective locations within the geographical area 102.

When a user attempts to zoom out of the geographic area 102, that is to transition from the zoom level N to a lower zoom level N−1, some of the labels 106-113 may collide or overlap with one another because the labels cannot be scaled down accordingly. In order to resolve potential collisions, the mapping software module 26 determines which labels will collide at the zoom level N−1 as soon as the user starts zooming out from the zoom level N. The mapping software module 26 then removes these labels immediately even before the user reaches the zoom level N−1.

In FIG. 2B, a screenshot 200 depicts a digital map of a geographic area 202 at an intermediate zoom level between the zoom levels N and N−1. The geographic area 202 is a zoomed-out view of the geographic area 102 shown in FIG. 2A. As such, the geographic area 202 also illustrates scalable map elements such as the roads 104. However, the roads 104 appear thinner in FIG. 2B because the roads 104 have been scaled down in size. On the other hand, the set of non-scalable text labels 106-113 have remained at their respective locations relative to the corresponding map elements and have not changed in size. In fact, some of the labels have been removed in order to prevent potential collisions between the labels. For example, the labels 107-111 have been removed due to possible collisions with the labels 106, 112 and 113. The removal of the labels 107-111 may be based on a ranking, such as a ranking of the labels according to the population density of the various neighborhoods represented by the labels 106-113, for example.

In addition, because the geographic area 202 represents a zoomed-out view, a larger geographic area is visible, in which extension of segments of the roads 104 may appear along with new roads that were not visible in FIG. 2A. Further, new text labels 206-210 may appear to indicate names of new neighborhoods that have come into view within the geographic area 202.

Figure 3:
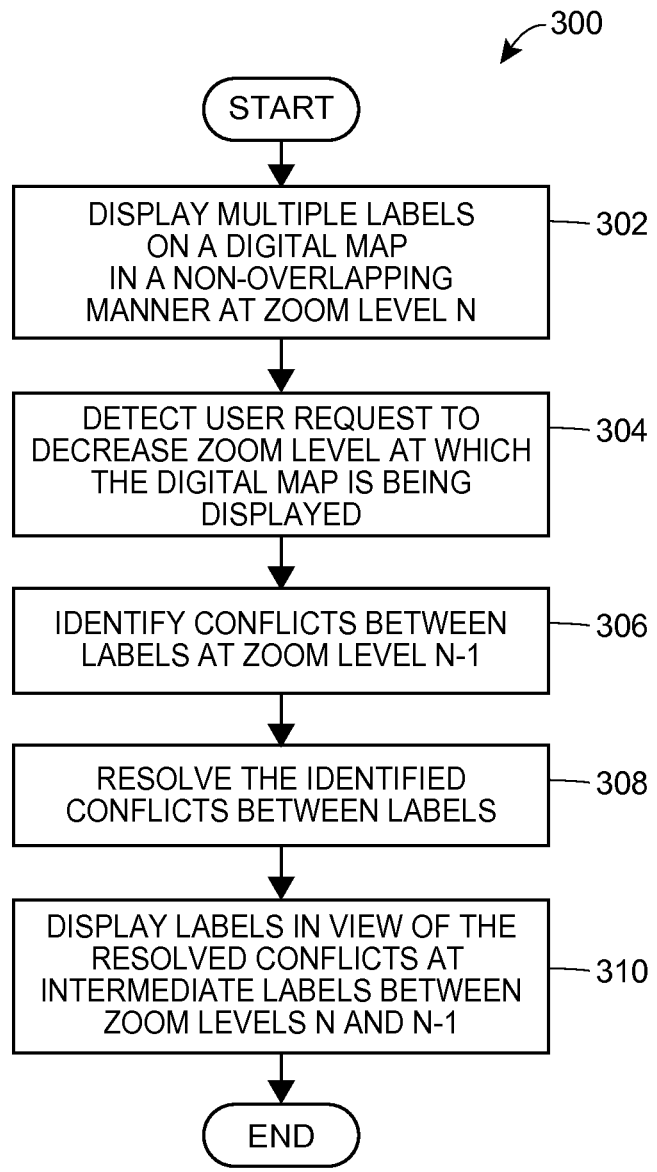
FIG. 3 is a flow diagram of an example method for resolving label collisions in a mapping module.

To further illustrate the techniques of resolving label collisions, an example method which a mapping software module operating on a computing device may implement is discussed next with reference to FIG. 3. In an example implementation, the method of FIG. 3 is implemented in the mapping software module 26 executing on the computing device 12. More generally, however, the method can be implemented in any suitable software application or module, and can be implemented as sets of instructions stored on a computer-readable medium and executable on one or more processors.

The flow diagram of FIG. 3 illustrates an example method 300 for resolving the collision of labels displayed on a map before the collision occurs. At block 302, multiple labels are displayed on a digital map for a specified geographic area at a zoom level N. The map may be shown on a touchscreen of a computing device, for example. At the zoom level N, the multiple labels are displayed in a non-overlapping manner on the map. The labels can correspond to cities, counties, neighborhood, roads, mountains, bodies of water, or any other geographic features.

Next, at block 304, an indication of a user request to zoom out of the zoom level N is detected. For example, a user input (e.g., a mouse click or scroll, a pinching gesture on a touchscreen, etc.) may indicate that the user wishes to change the zoom level on the map from the current zoom level N to a lower zoom level N−1. At block 306, as soon as the user begins to zoom out of the zoom level N and transition to the zoom level N−1, the method 300 identifies which labels in the displayed multiple labels will collide or overlap at the zoom level N−1. This identification helps to prevent possible label collisions during the transitioning period between the two zoom levels.

At block 308, the method 300 resolves the collision conflict of the identified labels. Generally speaking, resolving the collision conflict involves removing one or more offending labels so that potential label collisions can be avoided. In determining which offending labels to remove, the method 300 may consider various ranking information associated with the labels. The ranking information may indicate the relative importance of the labels with respect to each other. The labels may be ranked according to any criteria, such as alphabetically or according to some user preference, for example. Once the ranking of the labels is determined, the method 300 removes the offending labels immediately from the map even though the zoom level has not yet reached the intended zoom level N−1.

At block 310, the method 300 displays the labels on the map with the collision conflict resolved at intermediate zoom levels between the zoom level N and N−1.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for resolving label collisions on a digital map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for displaying labels on a digital map, the method comprising:
    displaying the digital map via a user interface at a first zoom level, including displaying a plurality of labels at respective locations without overlaps;
    receiving, via the user interface, a request to zoom out from the first zoom level to a second zoom level, wherein the second zoom level corresponds to smaller magnification than the first zoom level, and wherein the plurality of labels are displayed at the same size at the first zoom level and the second zoom level;
    in response to receiving the request and prior to zooming out from the first zoom level:
        determining that at least some of the plurality of labels overlap at the second zoom level when displayed at their respective locations, and
        resolving collisions among the plurality of labels at the second zoom level to generate a modified set of labels that do not overlap; and
    zooming out from the digital map at the first zoom level to the second zoom level via at least one intermediate zoom level between the first zoom level and the second zoom level, including displaying the digital map at the least one intermediate zoom level with the modified set of labels.

2. The method of claim 1, wherein resolving the collisions among the plurality of labels includes:
    for each collision between two or more labels, comparing priority of the colliding labels, and
    removing labels having lower priority.

3. The method of claim 1, wherein displaying the digital map includes render content defined in a vector graphics format.

4. The method of claim 1, wherein the plurality of labels is defined in a raster format.

5. The method of claim 4, wherein the plurality of labels identify at least some of (i) neighborhoods, (ii) cities, and (iii) counties.

6. The method of claim 1, wherein the first zoom level and the second zoom levels are discrete zoom levels.

7. A non-transitory computer-readable medium storing thereon instructions executable on one or more processors, wherein the instructions, when executed one or more processors, cause the one or more processors to:
    display a digital map via the user interface at a first zoom level, wherein the digital map includes (i) a plurality of elements scalable between the first zoom level and a second zoom level and (ii) a plurality of labels that do not scale between the first zoom level and the second zoom level, including displaying the plurality labels at respective locations without overlaps;
    receive, via the user interface, a request to display the digital map at the second zoom level;
    prior to zooming out from the first zoom level, (i) determine that at least some of the plurality of labels overlap at the second zoom level when displayed at t respective locations, and (ii) remove one or more labels from the plurality of labels, so that the remaining ones of the plurality of labels do not overlap at the second zoom level to generate a reduced set of labels; and
    after the one or more labels have been removed, begin to change the zoom level of the digital map from the first zoom level to the second zoom level, including display the digital map at an intermediate zoom level between the first zoom level and the second zoom level with the reduced set of labels.

8. The computer-readable medium of claim 7, wherein the instructions cause the one or more processors to progress from the first zoom level to the second zoom level via a plurality of intermediate levels.

9. The computer-readable medium of claim 7, wherein to remove the one or more labels, the instructions compare priority of the overlapping labels.

10. The computer-readable medium of claim 7, wherein the plurality of elements scalable between the first zoom level and a second zoom level are defined in a vector graphics format.

11. A computing device comprising:
a user interface;
one or more processors; and
a computer-readable memory storing thereon instructions that, when executed on the one or more processors, cause the computing device to:
display a digital map via the user interface at a first zoom level, including display a plurality of labels at respective locations,
receive, via the user interface, a request to zoom out from the digital map to a second zoom level, wherein the second zoom level corresponds to smaller magnification than the first zoom level, and wherein the plurality of labels have the same size at the first zoom level and the second zoom level,
in response to receiving the request and prior to zooming out from the first zoom level, (i) determine that at least some of the plurality of labels overlap at the second zoom level when displayed at t respective locations, and (ii) resolve collisions among the plurality of labels at the second zoom level to generate a modified set of labels that do not overlap, and
zoom out from the digital map at the first zoom level to the second zoom level via at least one intermediate zoom level, including display the digital map at the least one intermediate zoom level with the modified set of labels.

12. The computing device of claim 11, wherein to resolve the collisions among the plurality of labels, the instructions cause the one or more processors to:
for each collision between two or more labels, compare priority of the colliding labels, and
remove labels having lower priority.

13. The computing device of claim 11, wherein to display the digital map, the instructions cause the one or more processors to render content defined in a vector graphics format.

14. The computing device of claim 11, wherein the plurality of labels is defined in a raster format.

15. The computing device of claim 14, wherein the plurality of labels identify at least some of (i) neighborhoods, (ii) cities, and (iii) counties.

16. The computing device of claim 11, wherein the first zoom level and the second zoom levels are discrete zoom levels.

17. The method of claim 1, wherein resolving collisions among the plurality of labels at the second zoom level includes removing one or more of the plurality of labels.

18. The method of claim 1, wherein resolving collisions among the plurality of labels at the second zoom level includes changing transparency of one or more of the plurality of labels.

19. The method of claim 1, wherein resolving collisions among the plurality of labels at the second zoom level includes removing portions of one or more of the plurality of labels.

20. The method of claim 2, wherein resolving the collisions among the plurality of labels further includes:
for a pair of colliding labels that identify respective neighborhoods, determine which of the pair of neighborhoods has a lower population density, and remove the label corresponding to the neighborhood with the lower population density.

* * * * *